United States Patent
Ikeda et al.

(10) Patent No.: US 8,115,619 B2
(45) Date of Patent: Feb. 14, 2012

(54) INFORMATION PROCESSING APPARATUS, DOCUMENT MANAGEMENT SYSTEM AND METHOD, AND COMPUTER PROGRAM

(75) Inventors: Hitoshi Ikeda, Kanagawa (JP); Hirotsugu Kashimura, Kanagawa (JP); Motofumi Fukui, Kanagawa (JP); Hiroyuki Mitsu, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1146 days.

(21) Appl. No.: 11/332,160

(22) Filed: Jan. 17, 2006

(65) Prior Publication Data

US 2006/0167906 A1 Jul. 27, 2006

(30) Foreign Application Priority Data

Jan. 26, 2005 (JP) ................................ 2005-017769

(51) Int. Cl.
*G08B 1/08* (2006.01)
*G06F 3/00* (2006.01)
(52) U.S. Cl. ............... 340/539.13; 340/539.32; 715/745
(58) Field of Classification Search ............. 340/539.13; 186/55–56; 715/745; 707/100, 3
See application file for complete search history.

(56) References Cited

U.S. PATENT DOCUMENTS

| 6,826,607 | B1 * | 11/2004 | Gelvin et al. | 709/224 |
| 2002/0180588 | A1 * | 12/2002 | Erickson et al. | 340/10.2 |
| 2002/0196126 | A1 * | 12/2002 | Eisenberg et al. | 340/10.2 |
| 2004/0049571 | A1 * | 3/2004 | Johnson et al. | 709/224 |
| 2004/0100363 | A1 * | 5/2004 | Lane et al. | 340/5.86 |
| 2004/0251302 | A1 * | 12/2004 | Hoshina | 235/380 |
| 2004/0262381 | A1 * | 12/2004 | Mesaros | 235/380 |
| 2005/0017072 | A1 * | 1/2005 | Tomita | 235/451 |
| 2006/0016882 | A1 * | 1/2006 | Fujimoto | 235/380 |
| 2006/0220982 | A1 * | 10/2006 | Ueda | 345/1.1 |
| 2007/0103301 | A1 * | 5/2007 | Bowman et al. | 340/572.1 |
| 2007/0124345 | A1 * | 5/2007 | Heinz et al. | 707/204 |

FOREIGN PATENT DOCUMENTS

| JP | A-2001-22834 | 1/2001 |
| JP | 2002-128218 | 5/2002 |
| JP | 2003085329 A * | 3/2003 |
| JP | A 2003-182820 | 7/2003 |
| JP | A-2003-280993 | 10/2003 |
| JP | A-2004-131250 | 4/2004 |
| JP | A-2005-4571 | 1/2005 |
| JP | 2006027768 A * | 2/2006 |

OTHER PUBLICATIONS

NNRDD445140, May 1, 2001, "IBM Technical Disclosure Bulletin".*
May 11, 2010 Office Action issued in Japanese Application No. 2005-017769 (with translation).
Office Action issued in JP Application No. 2005-017769 on Jul. 27, 2010 (with English translation).

* cited by examiner

*Primary Examiner* — Chat Do
*Assistant Examiner* — Stephen Alvesteffer
(74) *Attorney, Agent, or Firm* — Oliff & Berridge, PLC

(57) ABSTRACT

An information processing apparatus includes an input section, a position calculation section, a storage section, a log information record section, a display data generation section and a display section. The input section receives document identification information, which are output as output signals from respective transmission portions set to correspond to respective documents, and user identification information, which are output as output signals from respective transmission portions set to correspond to users. The position calculation section calculates document positions and user positions based on the document identification information and the user identification information. The storage section stores the calculated document positions and the calculated user positions. The log information record section records document use histories of the users based on the stored document positions and the stored user positions. The display data generation section generates display data indicating a document position of a document, which was used by a particular user.

14 Claims, 9 Drawing Sheets

FIG. 3

| LOG NO. | DOCUMENT IDENTIFIER | USER IDENTIFIER | DOCUMENT HANDLING INFORMATION | | HANDLING TIME |
|---|---|---|---|---|---|
| | | | TAKEOUT | RETURN | |
| 001 | DOCUMENT A | USER c | ○ | | 2005,01,05,12:23,05 |
| 002 | DOCUMENT B | USER f | | ○ | 2005,01,05,12:31,23 |
| ‥ | ‥ | ‥ | ‥ | ‥ | ‥ |
| 00n | DOCUMENT N | USER c | | ○ | 2005,01,05,14:11,12 |

| LOG NO. | DOCUMENT IDENTIFIER | USER IDENTIFIER | DOCUMENT HANDLING INFORMATION | | HANDLING TIME |
| --- | --- | --- | --- | --- | --- |
| | | | TAKEOUT | RETURN | |
| 001 | DOCUMENT A | USER c | O | | 2005,01,05,12:23,05 |
| 00n | DOCUMENT N | USER c | | O | 2005,01,05,14:11,12 |

INFORMATION PROCESSING APPARATUS, DOCUMENT MANAGEMENT SYSTEM AND METHOD, AND COMPUTER PROGRAM

The entire disclosure of Japanese Patent Application No. 2005-17769 including the specification, claims, drawings and abstract is incorporated herein by reference in its entirety.

BACKGROUND OF THE INVENTION

1. Field of the Invention

The invention relates to an information processing apparatus, a document management system and method, and a computer program. More particularly, the invention relates to an information processing apparatus, a document management system and method, and a computer program, which manage documents such as files and books, which are kept in bookshelves within an office, a library or the like.

2. Description of the Related Art

Large numbers of books and document files are kept in bookshelves within, for example, an office or a library. The books and files are utilized by various users, for example, employees of the office or visitors of the library. The books and files, which the users want to utilize, are taken out of the bookshelves, and the taken-out books and files are restored into the bookshelves when the users completes utilizing them. In a section where the large numbers of documents are kept in custody, how efficiently a desired book is searched for is an issue.

A technique for searching for books is disclosed in, for example, JP 2003-182820 A. JP 2003-182820 A discloses that IC cards each of which stores peculiar identification information and includes a transmission portion for transmitting the identification information are attached to individual books, that transmission signals from the IC cards are received by a receiver, that the reception signals of the receiver are analyzed so as to obtain the position information of the respective books, and that the position information are multidimensionally displayed in, for example, an arrangement diagram, whereby the positions of the respective documents can be efficiently grasped.

According to this configuration, in the library by way of example, the user can check the presence or absence of the book desired to borrow and the position of the book in the bookshelf, on the basis of the author or document name of the book. More specifically, a database in which the identification information stored in the IC cards are associated with the book information of authors, document names, etc. is established, and the peculiar identification information corresponding to the IC card is specified on the basis of the author or document name input by the user, whereby the position of the book bearing the IC card can be efficiently checked.

In the above configuration disclosed by JP 2003-182820 A, however, the user needs to input the author name or the document name for the purpose of searching for the specified book or the like. In a case where the user forgets the author name or the document name, there arises a problem that the search is difficult.

SUMMARY OF THE INVENTION

The invention has been made in view of the problem described above, and provides an information processing apparatus, a document management system and method, and a computer program, which enable a user to efficiently search for a desired document such as book or file, even in a case where the user forgets attribute information corresponding to a document such as a particular document and file, for example, an author name or a document name.

According to an aspect of the invention, an information processing apparatus includes an input section, a position calculation section, a storage section, a log information record section, a display data generation section and a display section. The input section receives document identification information, which are output as output signals from respective transmission portions set to correspond to respective documents, and user identification information, which are output as output signals from respective transmission portions set to correspond to users. The position calculation section calculates document positions and user positions on a basis of the document identification information and the user identification information, which are input to the input section. The storage section stores the document positions and the user positions, which are calculated by the position calculation section. The log information record section records document use histories of the users on a basis of the document positions and the user positions, which are stored in the storage section. The display data generation section generates display data indicating a document position of a document, which was used by a particular user, on a basis of the document use histories of the particular user, which is recorded in the log information record section. The display section outputs the display data generated by the display data generation section.

According to another aspect of the invention, a document management system includes document-associated-signal output devices, user-associated-signal output devices and an information processing apparatus. The document-associated-signal output devices are disposed to correspond to respective documents. Each of the document-associated-signal output devices includes a storage portion that stores document identification information, and a transmission portion that outputs the document identification information stored in the storage portion. The user-associated-signal output devices are disposed to correspond to respective users. Each of the user-associated-signal output devices includes a storage portion that stores user identification information, and a transmission portion that outputs the user identification information stored in the storage portion. The information processing apparatus receives the document identification information output from the document-associated-signal output devices, and the user identification information output from the user-associated-signal output devices. The information processing apparatus executes information analyses. The information processing apparatus includes an output section, a position calculation section, a storage section, a log information record section, a display data generation section and a display section. The input section receives the document identification information and the user identification information. The position calculation section calculates document positions and user positions on a basis of the document identification information and the user identification information, which are input to the input section. The storage section stores the document positions and the user positions, which are calculated by the position calculation section. The log information record section records document use histories of the users on a basis of the document positions and the user positions, which are stored in the storage section. The display data generation section generates display data indicating a document position of a document, which was used by a particular user, on a basis of the document use histories of the particular user, which is recorded in the log information record section. The display section outputs the display data generated by the display data generation section.

According to still another aspect of the invention, an information processing method includes: inputting document identification information, which are output as output signals from respective transmission portions set to correspond to respective documents, and user identification information, which are output as output signals from respective transmission portions set to correspond to users; calculating document positions and user positions on a basis of the input document identification information and the input user identification information to store calculated data in a storage section; recording document use histories of the users on a basis of the document positions and the user positions, which are stored in the storage section; generating display data indicating a document position of a document, which was used by a particular user, on a basis of the recorded document use history of the particular user; and outputting the display data generated.

According to still further another aspect of the invention, a computer program is stored in a computer readable medium. The computer program causes a computer to execute a document management processing. The document management processing includes: inputting document identification information, which are output as output signals from respective transmission portions set to correspond to respective documents, and user identification information, which are output as output signals from respective transmission portions set to correspond to users; calculating document positions and user positions on a basis of the input document identification information and the input user identification information to store calculated data in a storage section; recording document use histories of the users on a basis of the document positions and the user positions, which are stored in the storage section; generating display data indicating a document position of a document, which was used by a particular user, on a basis of the recorded document use history of the particular user; and outputting the display data generated.

Incidentally, the computer program of the invention is a computer program, which can be offered by a storage medium, a communication medium, a recording medium such as CD, FD or MO, that offers the computer program in a computer-readable form to, for example, a computer system capable of executing various program codes or a computer program, which can be offered through a communication line such as a network. When such a program is offered in the computer-readable form, processes conforming to the program are realized on the computer system.

Other objects, features and advantages of the invention will be clarified by more detailed description based on the embodiments of the invention, which will be described later, and the accompanying drawings. By the way, in this specification, a word "system" shall signify the logical aggregate configuration of a plurality of devices, and it shall not be restricted to one having a single casing in which all constituent devices are installed.

According to the configuration of the invention, document identification information and user identification information are respectively acquired from a document IC card and a user IC card. Information indicating which user took out or returned which document is recorded as log data. Information corresponding to each user, that is, the position information of the document, which was used by a particular user in the past, is offered on the basis of the log data. Therefore, even in the case where the user forgets a document name or an author name, the document used in the past can be immediately detected, and the user can acquire the position information of the document, which was used at least once. Moreover, in the case where the user performed document processing such as copying or scanning, image data acquired in the processing or thumb-nail data based on the image data are recorded as log data. The data can be offered to the user in accordance with his/her request, so that the user can confirm the pertinent document efficiently and reliably.

BRIEF DESCRIPTION OF THE DRAWINGS

FIG. 3 is a diagram for explaining an example of data layout of log information, which a log information record section 205 records.

DETAILED DESCRIPTION OF EMBODIMENTS OF THE INVENTION

Now, the details of an information processing apparatus, a document management system and method, and a computer program according to embodiments of the invention will be described with reference to the drawings.

Figure 1:
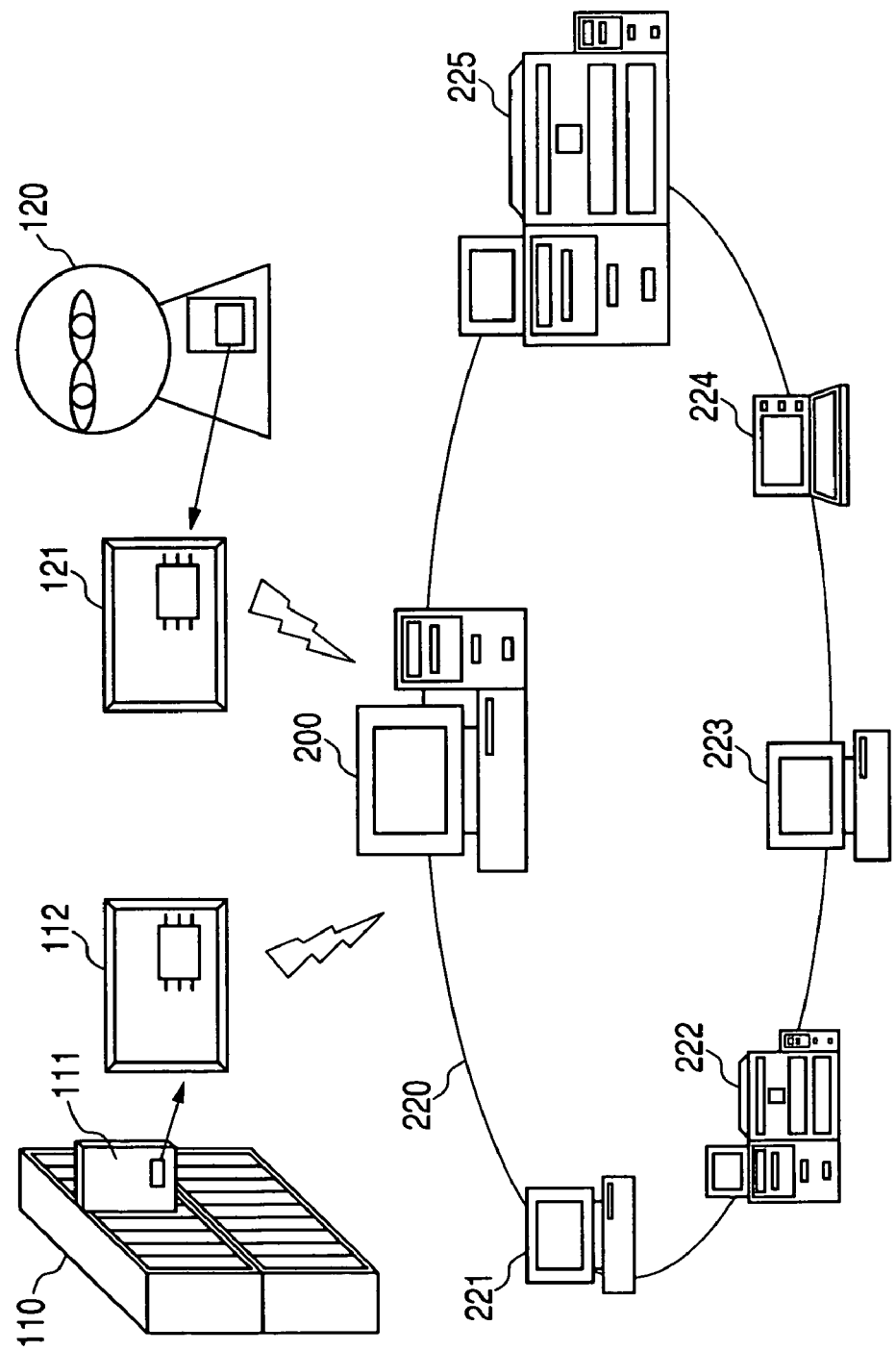
FIG. 1 is a view for explaining the general configuration of a document management system according to one embodiment of the invention.

First, the outline of the document management system will be described with reference to FIG. 1. The document management system is applied to a place where large numbers of books and files exist, such as library or office. As shown in FIG. 1, large numbers of books and files are housed in the bookshelves 110. In the specification, books, files and the like, which are search targets, will be collectively referred to as "documents."

Each of documents 111 housed in the bookshelf 110 shown in FIG. 1 is attached an individual IC card, namely, a document IC card 112. The document IC card 112 is configured to store document identification information in a memory and output a signal containing the document identification information through a transmission portion. That is, the document IC card 112 functions as a document-associated-signal output device that outputs the document identification information, which is a document-associated signal. On the other hand, each user 120 who utilizes any document housed in the bookshelf 110 is given a user IC card 121. The user IC card 121 is configured to store user identification information in a memory and to output a signal containing the user identification information through a transmission portion. For example, in the case where the users are employees within the office, each user IC card 121 may be a card, which is utilized as an employee's identification card. Also, in the case of the library, each user IC card 121 may be configured as a reader card, which is lent to a reader or visitor when he/she enters the library. Such a user IC card 121 functions as a user-associated-signal output device, which outputs the user identification information, which is a user-associated signal.

The document identification information is output from each document IC card 112, while the user identification information is output from each user IC card 121. The output signals are transferred to an information processing apparatus 200 through receivers, which are installed in the office or library.

The information processing apparatus 200 executes various analyses on the basis of the document identification information and user identification information, which are input from the respective IC cards. The details of the analysis processing will be described later. The information processing apparatus 200 is connected by a network 220 with other information equipments installed in the office or library, that is, with various information processing apparatuses such as a copying machine, a scanner, a printer and a PC. The information processing apparatus 200 is configured to be capable of transferring data to and from various information processing apparatuses connected thereto through the network. In the figure, PCs 221, 223 and 224, and multifunctional type information processing apparatuses 222 and 225 capable of copying, scanning, printing and various data processing are shown in addition to the information processing apparatus 200, as the network-connected equipments.

The user 120 can execute various processes by utilizing the equipments, for example, executes copying and scanning the document 111 with the multifunctional type information processing apparatus 222 or 225. Besides, he/she can display various information, such as the position information of a desired document, on the display of the information processing apparatus 200 or any of the displays of the PC 221, 223 or 224.

Figure 2:
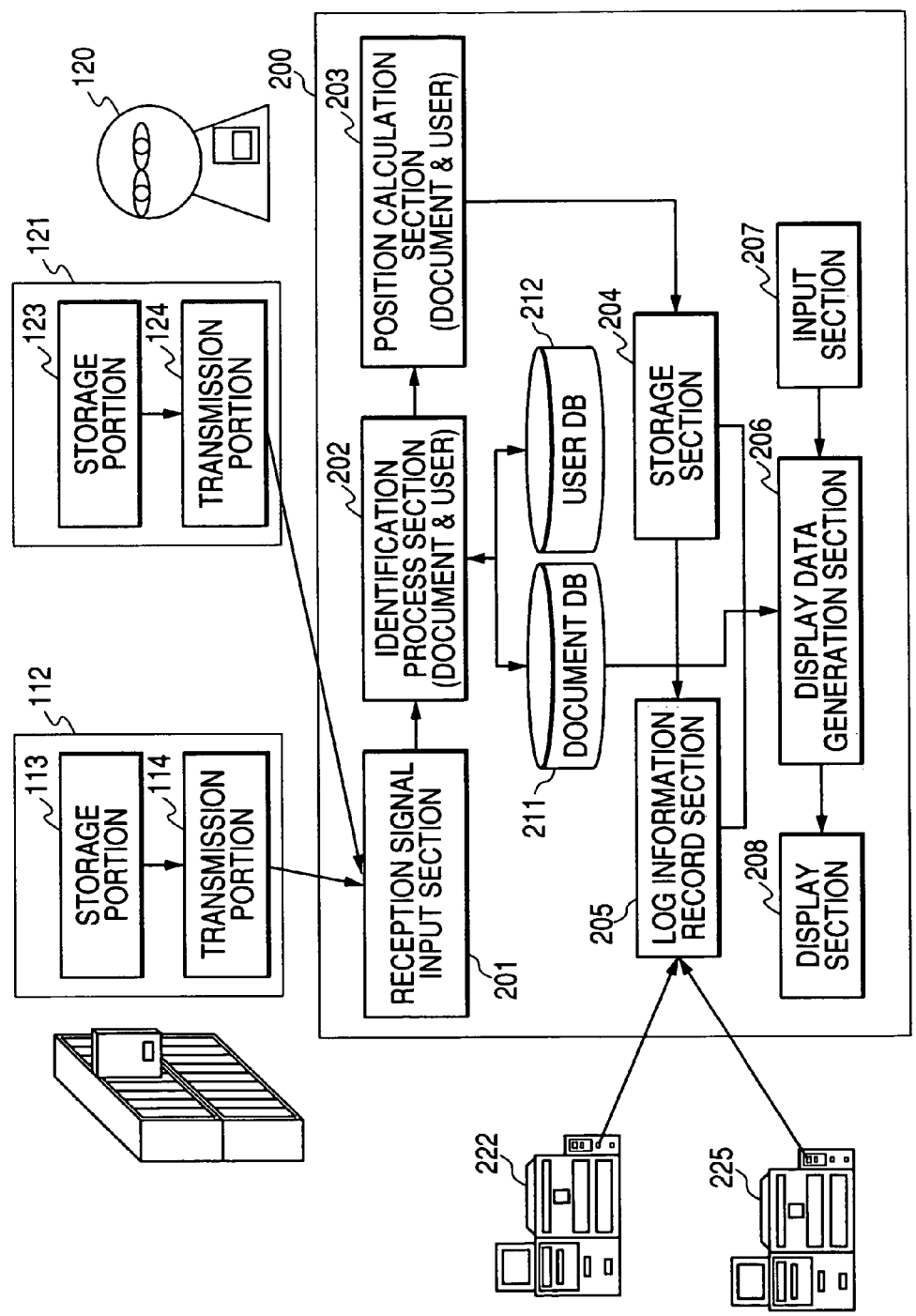
FIG. 2 is a diagram for explaining details of the configuration and processes of an information processing apparatus 200 to which document identification information output from a document IC card and user identification information output from a user IC card are input, and which executes analysis processing.

Next, reference will be had to FIG. 2 to describe the details of the configuration and processing of the information processing apparatus 200, which executes the various analysis processings by receiving the document identification information output from each document IC card 112 and the user identification information output from each user IC card 121.

As shown in FIG. 2, each document IC card 112 includes a storage portion 113 and a transmission portion 114. The document identification information, for example, peculiar identification information such as a file name and a class name is stored in the storage portion 113 of the document IC card 112. Document identification information are data registered in a document database 211 and enable to distinguish the documents based on the data registered in the document database 211. The transmission portion 114 transmits a signal, which contains the document identification information stored in the storage portion 113.

On the other hand, the user IC card 121 includes a storage portion 123 and a transmission portion 124. The user identification information—for example, identification information including an employee number and belonging division information of a user who are an employee, or identification number including visitor's sequence number of a user of the library—is stored as user identification number in the storage portion 123 of the user IC card 121. Incidentally, the user identification numbers are data registered in a user database 212 and enable to distinguish the users based on the data registered in the user database 212. The transmission portion 124 transmits a signal, which contains the user identification information stored in the storage portion 123.

As shown in FIG. 2, the information processing apparatus 200 includes a reception signal input section 201, an identification process section 202, a position calculation section 203, a storage section 204, a log information record section 205, a display data generation section 206, an input section 207, a display section 208, the document database 211, and the user database 212.

The reception signal input section 201 of the information processing apparatus 200 receives the document identification information output from the document IC cards 112, and the user identification information output from the user IC cards 121. For example, a plurality of antennas are installed in the office, the individual antennas sense the document identification information signal output from the document IC cards 112 and the user identification information signal output from the user IC cards 121, and the sensed signals are input from the antennas to the reception signal input section 201 through cables. The identification information signals input to the reception signal input section 201 are input to the identification process section 202. The identification process section 202 executes an identification process with respect to a document, on the basis of the data stored in the document database 211 and the document identification information input from the reception unit 201. Also, the identification process section 202 executes an identification process with respect to a user, on the basis of the data stored in the user database 212 and the user identification information input from the reception unit 201.

Data generated in such processes by the identification process section 202 may be a list of documents, which are housed in bookshelves within the office and are outputting document identification numbers, for example, a list of [document A], [document B], [document C], [document D] . . . , and a list of users who are in the office, for example, a list of [user a], [user b], [user c] . . . .

The identification process section 202 outputs these information to the position calculation section 203. The position calculation section 203 calculates positions of the documents, which are identified by the identification process section 202, and positions of the users who are identified by the identification process section 202. The position calculation section 203 executes position calculation processing by specifying a transmission position of the output signal of each IC card. Any of various methods may be applied to the position calculation processing. For example, the antenna, which has sensed an electric wave output from each IC card, is determined, an arrival direction of the electric wave is detected on the basis of the position of the antenna having received the signal, and the position of the IC card, which is transmitting the signal is specified on the basis of the information of the detected direction, whereby the position of each document and the position of each user can be discriminated. Alternatively, a position measurement system such as a GPS function may be employed.

The position calculation section 203 generates position data for the document list: [document A], [document B], [document C], [document D] . . . , and the user list: [user a], [user b], [user c] . . . , which have been input from the identification process section 202. The position data are generated as, for example, three-dimensional coordinate data of (x, y, z) system.

The position information of the documents and the position information of the users, which are calculated by the position calculation section 203, are stored in the storage section 204.

The storage section 204 holds the position information of the each document and the position information of each user. Incidentally, the position calculation section 203 may calculate the positions of the documents and the positions of the users at all times or periodically. The storage section 204 accumulates the position information corresponding to each measurement time. That is, the position information at a time t0, the position information at a time t1, and the position information at time t2, the position information at time t3, . . . are accumulated in the storage section 204.

The log information record section 205 detects change of state, that is, movement state of documents—such as which user takes out which document from a bookshelf or which user returns which document to a bookshelf—on the basis of information on changes of the position information of the documents and the position information of the users, which are recorded in the storage section 204, over time. Then, the log information record section 205 records such detection information as log information.

The information recorded by the log information record section 205 may be data as shown in FIG. 3. Specifically, the recorded information is set as data in which a document identifier, a user identifier, and document handling information are associated with each other. For example, log No. 001 indicates that handling in which the [user c] took the [document A] out of the bookshelf was performed at 12:23:05 on Jan. 5, 2005. Log No. 002 indicates that handling in which the [user f] returned the [document B] to the bookshelf was performed at 12:31:23 on Jan. 5, 2005. In this manner, the log information record section 205 records the information indicating when which user took out which document from the bookshelf and the information indicating when which user returned which document to the bookshelf, as the log information, on the basis of information on changes of the position information of the documents and the position information of the users, which are recorded in the storage section 204, over time.

In order to display the position of each document on the display section 208 as multidimensional position information such as three-dimensional graphics data, the display data generation section 206 combines the position information of the documents stored in the storage section 204 with pre-generated office layout information and pre-generated book-shelf position information to generate display information such as the three-dimensional graphics data and output the generated display information to the display section 208. The display section 208 outputs the display data, such as the three-dimensional graphics data, which is generated by the display data generation section 206. The display section 208 may further display the positions of the users simultaneously. Here, the embodiment is not limited to that the data is displayed on the display section 208 of the information processing apparatus 200. In the embodiment, the data may be displayed by means of a display of a network-connected PC, which a user sees, such as displays of the PCs 221, 223, 224 in the system configuration shown in FIG. 1. In this case, the information processing apparatus 200 transfers the display data to the PC through the network 220, and the transferred display data are displayed on the display of the PC.

In a case where a user is to search for a document a bookshelf in the office or the library, the user attached the user IC card 121 approaches the information processing apparatus 200 connected to the network 220 or the network-connected PC 221, 223 or 224 shown in FIG. 1. The information processing apparatus 200 always detects the position of the user 120. Therefore, the information processing apparatus 200 can detect that the user 120 approaches the information processing apparatus 200 or the network-connected PC 221, 223 or 224. The information processing apparatus 200 transmits display data to the PC 221, 223 or 224, which has been detected as the user 120 approaching, to display the display data. As a result, the user 120 can obtain various information through the display of any of the information processing apparatus 200 and the PCs 221, 223 and 224, which he/she has approached.

In the case where it has been detected that the user 120 approaches the information processing apparatus 200 or the network-connected PC 221, 223 or 224, a past document use history, which concerns the user 120 having approached, is extracted from the log information record section 205 in the information processing apparatus 200, and is sent to the display data generation section 206.

In a case, for example, where the user c has approached the PC 221 shown in FIG. 1, the information processing apparatus 200 extracts only log information concerning the user c from the log information record section 205 and sends the extracted log information to the display data generation section 206. The display data generation section 206 combines information on the order of higher frequency in use or the order of the dates of uses, information on the positions of the documents, which were taken out in the past, within the bookshelves, and the information of the arrangement diagram of the bookshelves, and transmits the combined information to the display section 208 as display information. The display section 208 displays the positions of the documents on the multidimensional arrangement diagram of the bookshelves. At this time, the display section 208 may present hint of the search to the user by changing display colors or display patterns of the documents in order of higher frequency in use or in order of the dates of uses.

The embodiment is not limited to that the data is displayed on the display section 208 of the information processing apparatus 200. In the embodiment, the data may be displayed by means of a display of a network-connected PC, which a user sees, such as displays of the PCs 221, 223, 224 in the system configuration shown in FIG. 1. In this case, the information processing apparatus 200 transfers the display data to the PC through the network 220, and the transferred display data are displayed on the display of the PC.

Figures 4A, 4B:
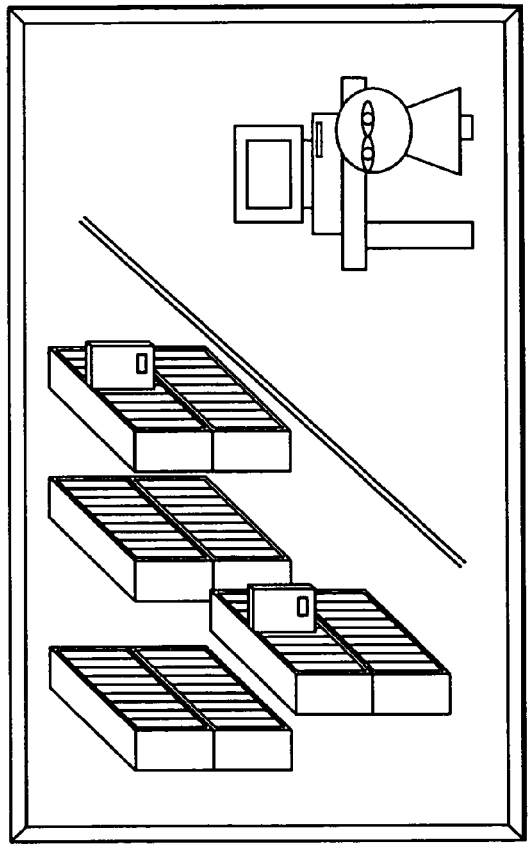
FIG. 4 is a diagram for explaining a data example and a display example of a log, which is extracted in order to generate display information for a user.

A data example and a display example of the extracted log will be described with reference to FIG. 4. FIG. 4A shows the extracted data of the log data corresponding to the user c. The extracted data indicate that the user c has the utilization history of the documents A and N. FIG. 4B shows the display example of the three-dimensional graphics data indicating document positions, which are displayed on the display section 208 on the basis of the log data. In this example, the positions of the documents A and N are discriminatively displayed. In the illustrated example, the documents are caused to jump out of the bookshelves. It is possible, however, to display the document positions in various identifiable aspects such as altering the display colors as described before.

In the case where the user wants to know the detailed information of any document displayed on the display section 208, he/she designates the document using the input section 207 (refer to FIG. 2) such as a touch pad, which overlaps on the display of the display section 208. In response, the display data generation section 206 acquires the document information stored in the document database 211, and the acquired data are transferred from the display data generation section 206 to the display section 208. As a result, the detailed information of the document can be displayed on the display section 208.

Figure 5:
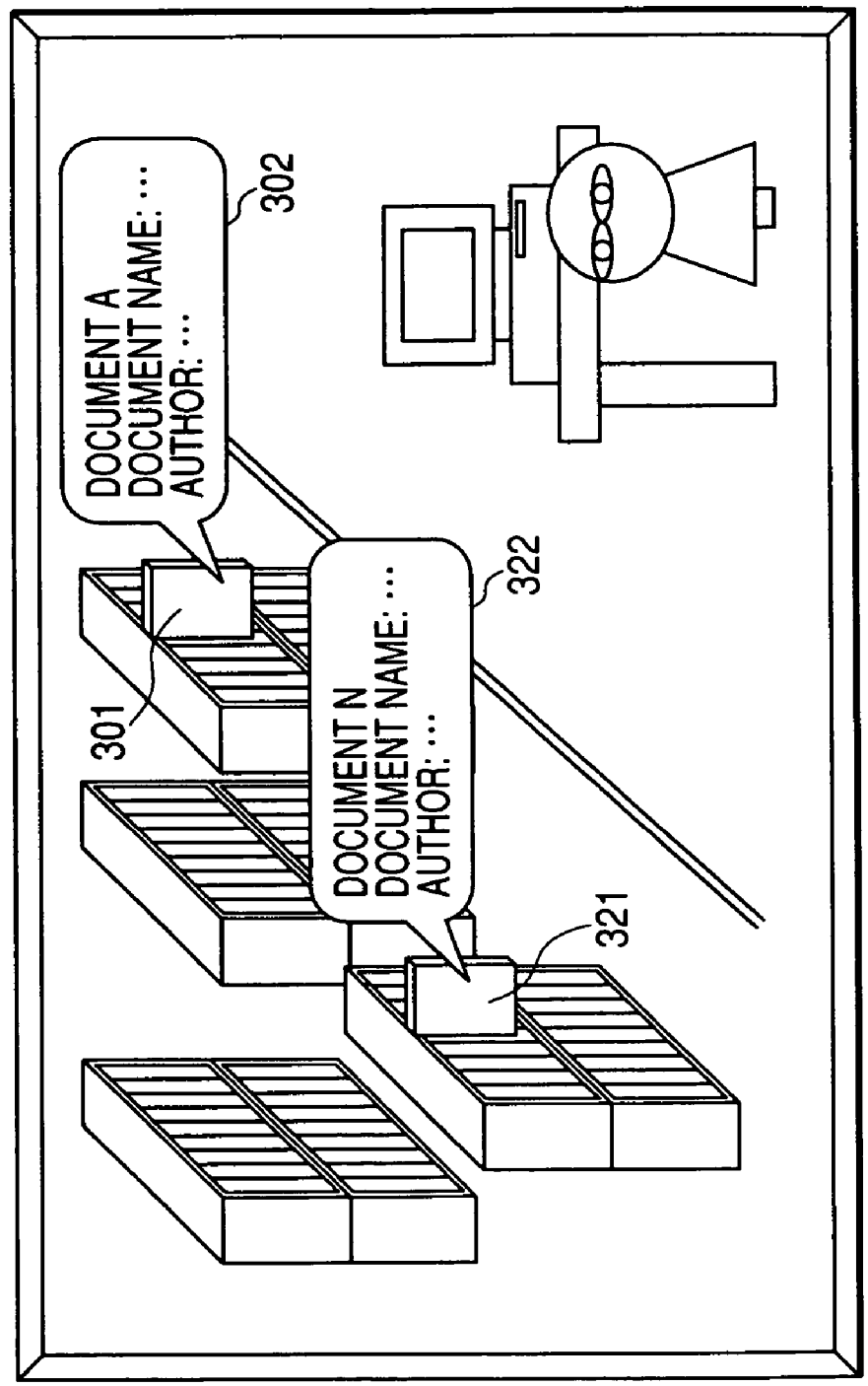
FIG. 5 is a view showing a display example of detailed information of documents displayed on a display section.

For example, as shown in FIG. 5, when the user wants to know the detailed information of a document 301 displayed on the display section 208, he/she touches displayed data of the document 301, whereby the designation of the document 301 by the user is detected. When the detection information is input to the display data generation section 206, this display data generation section 206 acquires document information on the document A, which is stored in the document database 211, and transfers the acquired data to the display section 208, whereby the detailed information 302 of the document as shown in FIG. 5 is displayed on the display section 208. The detailed information 302 contains a book name and an author name, which are the document information on the document A stored in the document database 211.

Likewise, when the user touches displayed data of a document 321, the designation of the document 321 by the user is detected. When the detection information is input to the display data generation section 206, the display data generation section 206 acquires document information on the document N, which is stored in the document database 211, and transfers the acquired data to the display section 208, whereby the detailed information 322 of the document as shown in FIG. 5 is displayed on the display section 208.

Further, in the case where the image of any document has been read using the network-connected information processing apparatus such as copying machine or scanner, the log information record section 205 of the information processing apparatus 200 shown in FIG. 2 records data of the read image or its thumb-nail data as the log information.

Figure 6:
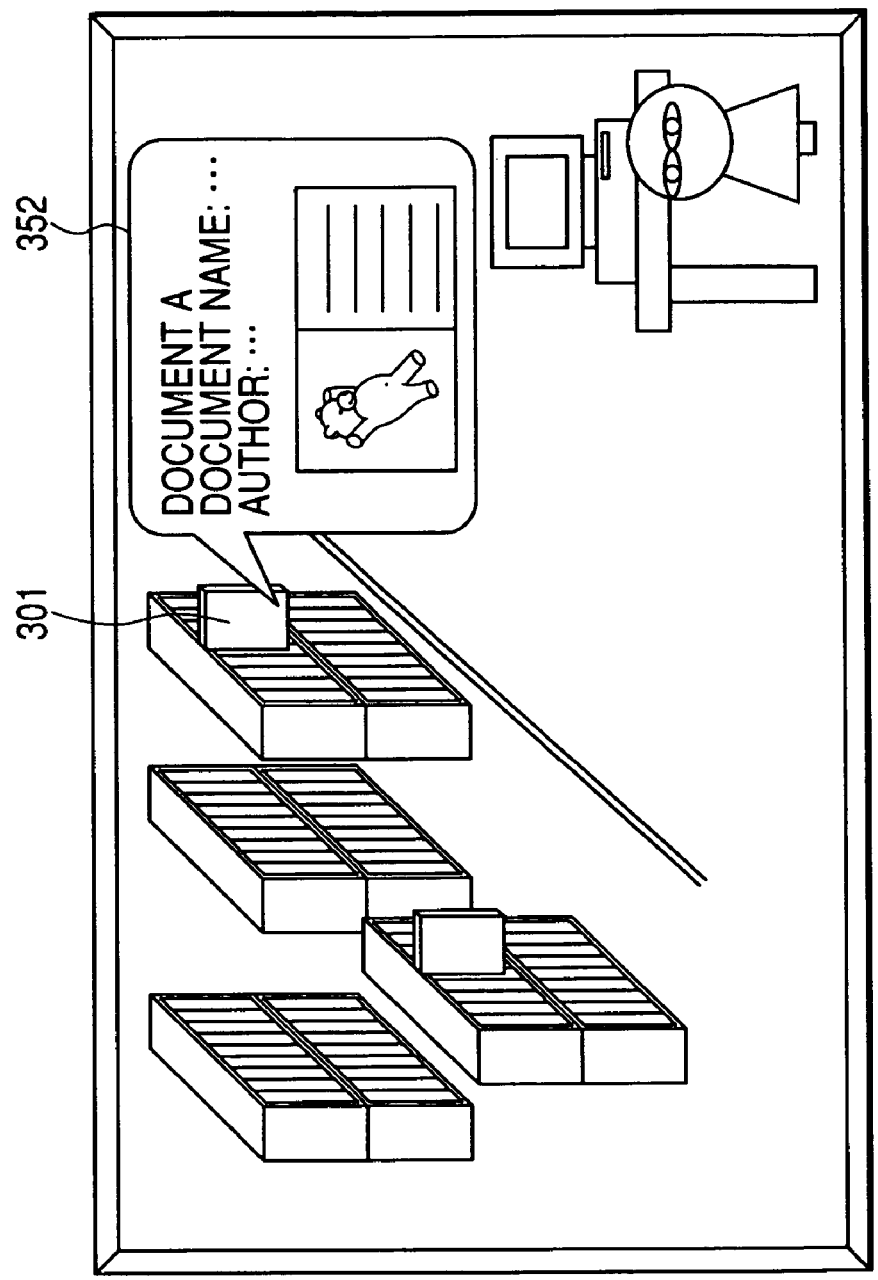
FIG. 6 is a view showing a display example of the detailed information of the document displayed on the display section, this display example containing image data of the document.

In the case where the user has made a request for displaying detailed information of a document for which image data or thumb-nail data have been recorded as the log information, the image data recorded in the log information record section 205 are displayed as shown in FIG. 6 as well as data such as a book name and an author name, which are the document information of the document A stored in the document database 211. The user can confirm contents of the document easily and reliably on the basis of the document information and the image data.

Figure 7:
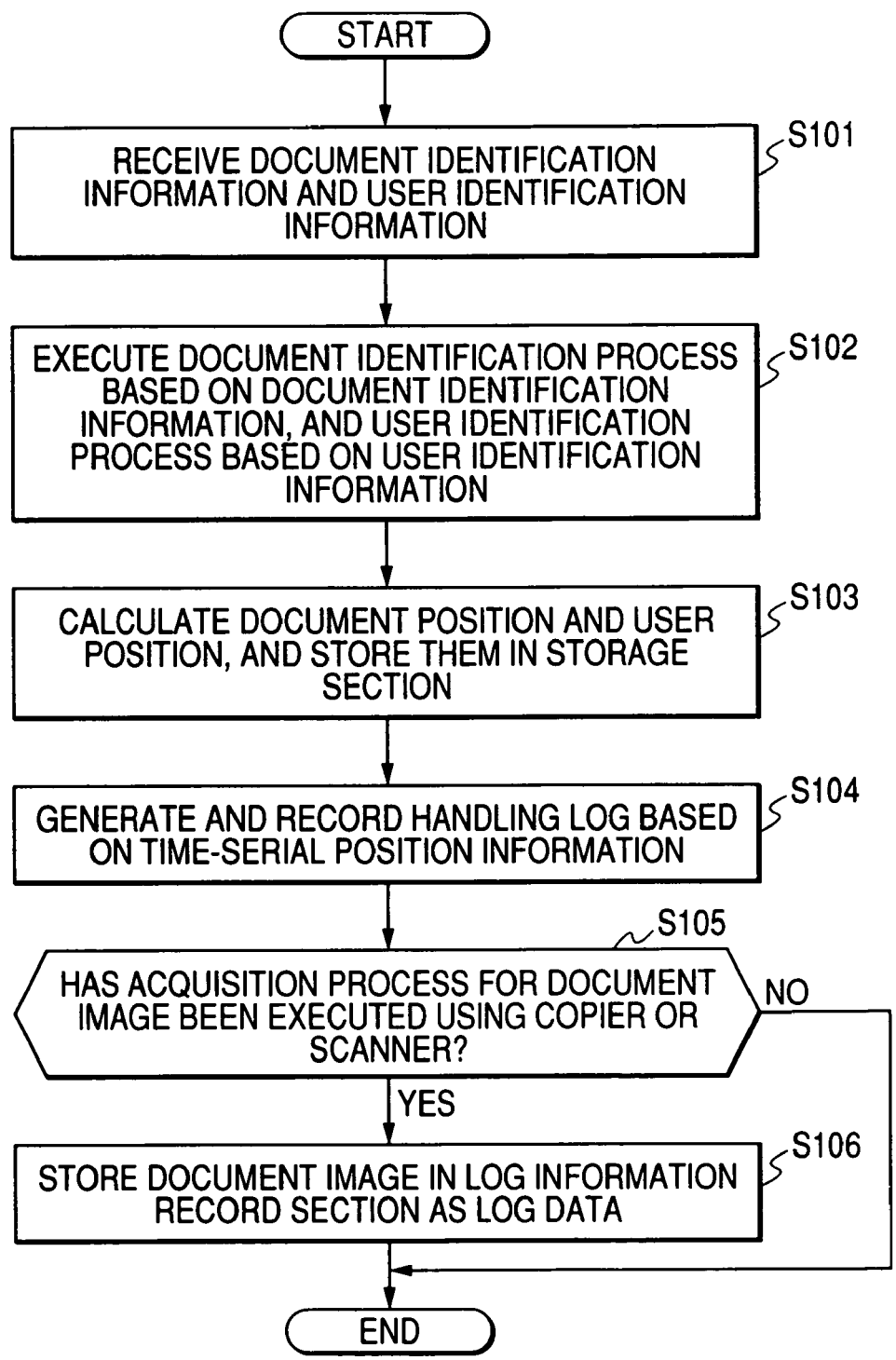
FIG. 7 is a flow chart for explaining a processing sequence in which the information processing apparatus 200 acquires the document identification information and the user identification information from the respective IC cards, generates the log data and stores them in the log information record section 205.
Figure 8:
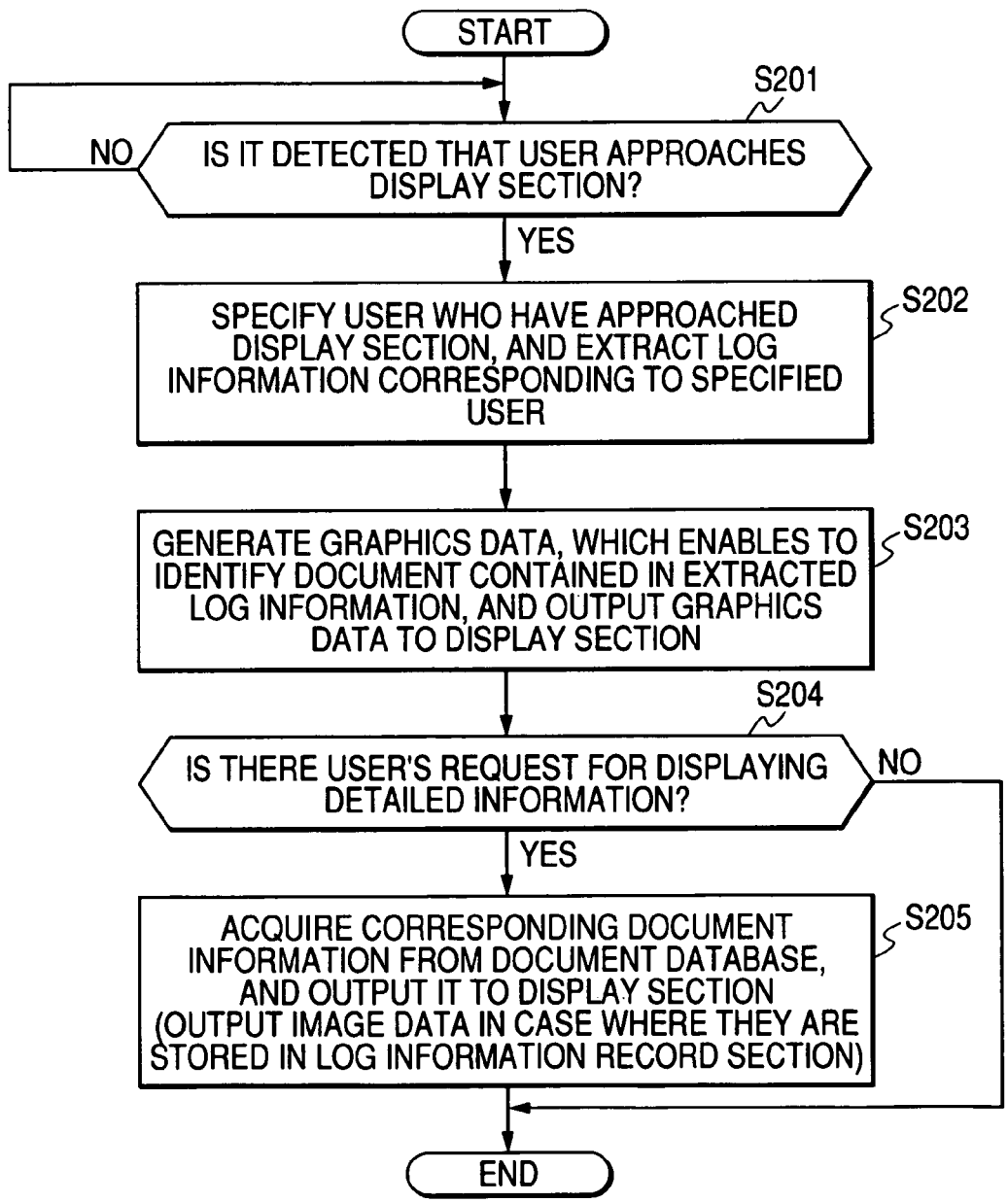
FIG. 8 is a flow chart for explaining sequence of an information display process for the user.

Next, the procedure of data processing, which is executed by the document management system according to this embodiment, will be described with reference to flow charts of FIGS. 7 and 8. FIG. 7 shows a flow chart for explaining a processing sequence in which the information processing apparatus 200 acquires the document identification information and the user identification information from the respective IC cards, generates the log data shown in FIG. 3 and stores the generated log data in the log information record section 205. On the other hand, FIG. 8 shows a flow chart for explaining the sequence of the information display process for the user.

First, description will be given with reference to FIG. 7 on a processing sequence in which the information processing apparatus 200 acquires the document identification information and the user identification information from the respective IC cards, generates the log data shown in FIG. 3 and stores the generated log data in the log information record section 205.

First of all, at a step S101, in the information processing apparatus 200, the document identification information output from the document IC card 112 and the user identification information output from the user IC card 121 are input to the reception signal input section 201 shown in FIG. 2.

Subsequently, at a step S102, the identification information signals input to the reception signal input section 201 are input to the identification process section 202. The identification process section 202 executes the document identification process on the basis of the data stored in the document database 211 and the document identification information input from the reception unit 201. Furthermore, the identification process section 202 executes the user identification process on the basis of the data stored in the user database 212 and the user identification information input from the reception unit 201.

Subsequently, at a step S103, the position calculation section 203 calculates the positions of the documents identified by the identification process section 202 and the positions of the users identified by the identification process section 202. Then, the position calculation section 203 stores the calculated positions in the storage section 204.

Subsequently, at a step S104, the log information record section 205 detects detects change of state, that is, movement state of documents—such as which user takes out which document from a bookshelf or which user returns which document to a bookshelf—on the basis of information on changes of the position information of the documents and the position information of the users, which are recorded in the storage section 204, over time. Then, the log information record section 205 records such detection information as log information. The recorded information of the log information record section 205 may be the data, which have been described with reference to FIG. 3.

Subsequently, at a step S105, it is determined whether or not an image of a document has been read in the network-connected information processing apparatus such as copying machine or scanner. If it is determined that the image of the document has been read, the log information record section 205 records the data of the read image or the thumb-nail data thereof as the log information at a step S106.

In this manner, the handling information such as takeout of the documents by the users and return of the documents by the users are accumulated in the log information record section 205 as the log data shown in FIG. 3. Also, in the case where the image of the document has been read in the network-connected information processing apparatus such as copying machine or scanner, the data of the read image or the thumb-nail data thereof are recorded in the log information record section 205 as well.

Next, description will be given with reference to FIG. 8 on the processing sequence, which the information processing apparatus 200 executes in the information display process for the user.

First of all, at a step S201, it is detected whether or not the a user has approached the information processing apparatus 200 connected to the network 220, or the network-connected PC 221, 223 or 224 shown in FIG. 1. The information processing apparatus 200 is always detecting the position of the user 120, so that the information processing apparatus 200 can detect that the user approaches the information processing apparatus 200 or the network-connected PC 221, 223 or 224.

If the information processing apparatus 200 detects that the user approaches the information processing apparatus 200 or the network-connected PC 221, 223 or 224, the information processing apparatus 200 extracts the history of past document use history concerning the user who has approached, from the log information record section 205 at a step S202, and sends the extracted history to the display data generation section 206. For example, when the user c has been detected as a user having approached the display section, only the log information concerning the user c is extracted from the log information record section 205, and is sent to the display data generation section 206. In this case, the log information may be the extracted log data shown in FIG. 4A.

Subsequently, at a step S203, the display data generation section 206 combines the position information of the documents, which are contained in the extracted log information, with the information of the bookshelf arrangement diagram, thereby to generate three-dimensional graphics data, which enables to identify the positions of the documents contained in the extracted log information. The display data generation section 206 outputs the generated three-dimensional graphics data to the display section 208. For example, the display data shown in FIG. 4B are displayed on the display of the PC, which the user has approached.

Subsequently, at a step S204, it is detected whether or not the user has made a request for displaying detailed information, by designating any of the documents using the input section such as touch pad. If it is detected that the request for displaying the detailed information has been made, the processing sequence proceeds to a step S205. At the step 205, the display data generation section 206 acquires document information stored in the document database 211 and transfers the acquired detailed document information to the display section 208 so as to display the detailed information on the display section 208. For example, in the case where the document 301 displayed on the display section 208 is designated as shown in FIG. 5, the detailed information 302 is displayed on the display section 208. The detailed information 302 contains the book name and the author name, which are the document information of the document A, which is stored in the document database 211.

In the case where the user has made a request for displaying detailed information as to any document for which the image data or the thumb-nail data have been recorded as the log information, the image data recorded in the log information record section 205 are displayed as shown in FIG. 6, as well as the data of a book name and an author name, which are document information of the document A stored in the document database 211.

As described above, in the document management system according to this embodiment, document identification information and user identification information are respectively acquired from a document IC card and a user IC card. Information indicating which user took out or returned which document are recorded as log data. Information corresponding to each user, that is, the position information of a document, which the user utilized in the past, is offered on the basis of the log data. According to this configuration, even in the case where the user forgets a book name or an author name, the document utilized in the past can be immediately detected and be acquired its position information. Besides, in the case where the user has performed document processing such as copying or scanning, image data acquired in the processing or thumb-nail data based on the image data are recorded as the log data. The recorded data can be offered to the user in accordance with the user's request, so that the user can confirm the document efficiently and reliably.

Lastly, an example of the hardware configuration of the information processing apparatus 200 will be described with reference to FIG. 9. A CPU (Central Processing Unit) 501 is a control unit which executes the various data processing described in the above embodiment, that is, processes conforming to various computer programs that describe the execution sequences of the processes such as the position calculations based on the respective identification information acquired from the IC cards, the storage of the position information, the generation and storage processes for the log information as described with reference to FIG. 3, and the generation and output processes for the display data.

A ROM (Read Only Memory) 502 stores therein the programs, arithmetic parameters, etc. which the CPU 501 uses. A RAM (Random Access Memory) 503 stores therein the program which is used in the run of the CPU 501, parameters which occasionally change in the run, etc. The constituents 501-503 are interconnected by a host bus 504 which is constructed of a CPU bus, etc.

The host bus 504 is connected to an external bus 506 such as PCI (Peripheral Component Interconnect/Interface) bus, through a bridge 505.

A keyboard 508 and a pointing device 509 are input devices which are manipulated by the user. A display 510 is constructed of a liquid-crystal display device, a CRT (Cathode Ray Tube) or the like, and it indicates various information as text and image information.

An HDD (Hard Disk Drive) 511 has built-in hard disks, and it drives the hard disks so as to record or reproduce information and the program which is run by the CPU 501. The hard disks function as, for example, the storage section 204, log information record section 205, document database 211 and user database 212 described with reference to FIG. 2. Further, they store therein various computer programs such as data processing programs.

A drive 512 reads out data or a program recorded in a set removable record medium 521 such as a magnetic disk, an optical disk, a magnetooptical disk or a semiconductor memory, and it supplies the read-out data or program to the RAM 503 which is connected to this drive 512 through an interface 507, the external bus 506, the bridge 505 and the host bus 504. Likewise to the hard disks, the removable record medium 521 can function as the storage section 204, log information record section 205, document database 211 and user database 212 described with reference to FIG. 2.

A connection port 514 is a port for connecting an external connection equipment 522, and it has connection parts for the USB, the IEEE 1394, etc. The connection port 514 is connected to the CPU 501, etc. through the interface 507, external bus 506, bridge 505, host bus 504, etc. A communication unit 515 is connected to the network (220 in FIG. 1), and it executes the processing of data communications with the exterior.

Figure 9:
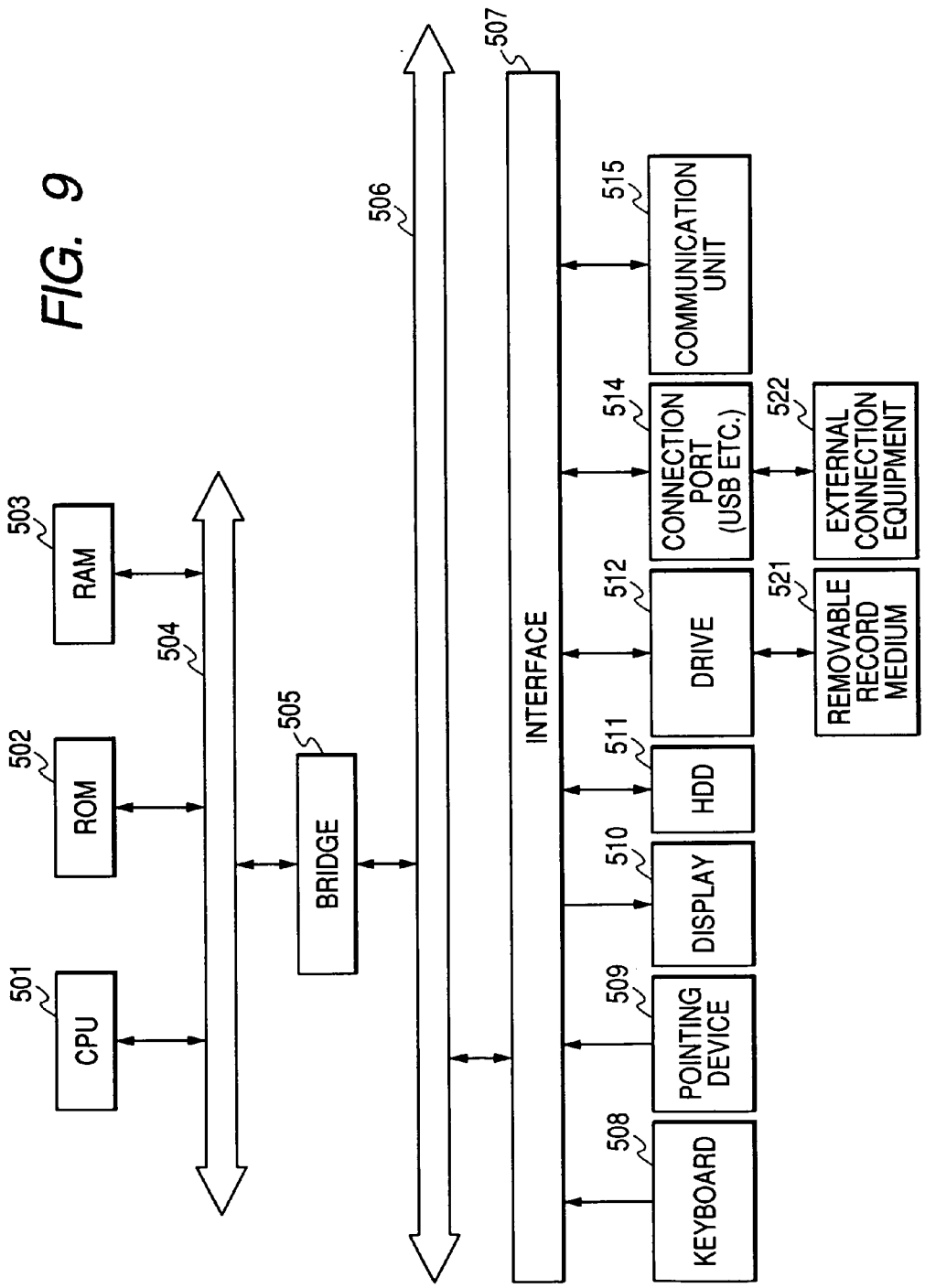
FIG. 9 is a diagram for explaining an example of the hardware configuration of the information processing apparatus 200 in the document management system according to one embodiment of the invention.

Incidentally, the hardware configuration example of the information processing apparatus as shown in FIG. 9 shows a fundamental apparatus example. The information processing apparatus of the invention is not restricted to the configuration shown in FIG. 9, but it may have a configuration capable of executing the processes described in the foregoing embodiment.

Thus far, the invention has been elucidated in detail in conjunction with the specified embodiment. It is obvious, however, that one skilled in the art can make alterations or substitutions in the embodiment within a scope not departing from the purport of the invention. That is, the invention has been disclosed in exemplary aspects and ought not to be narrowly construed. The appended claims ought to be considered for judging the purport of the invention.

Incidentally, the series of processes described in this specification can be executed by a hardware configuration or/and a software configuration. In case of executing the processes in software fashion, programs in which the processing sequences are recorded can be respectively installed in memories within computers which are assembled as dedicated hardware circuits, so as to be run, or the programs can be installed in a general-purpose computer which is capable of executing the various processes, so as to be run.

By way of example, the program can be recorded in a hard disk or ROM (Read Only Memory) being a record medium, beforehand. Alternatively, the program can be temporarily or persistently stored (recorded) in a removable record medium such as flexible disk, CD-ROM (Compact Disk Read Only memory) MO (MagnetoOptical) disk, DVD (Digital Versatile Disk), magnetic disk, or semiconductor memory. Such a removable record medium can be offered as so-called "package software".

Incidentally, apart from the installation from the removable record medium into the computer as stated above, the program may well be transferred from a download site to the computer wirelessly or to the computer in wired fashion through a network such as a LAN (Local Area Network) or the Internet, whereupon the computer can receive the program thus transferred and install it in a record medium such as built-in hard disk.

By the way, the various processes stated in this specification may be executed in time series in conformity with the statements, but they may well be executed in parallel or individually in accordance with the processabilities of devices which execute the processes, or if necessary. Besides, in this specification, the word "system" signifies the logical aggregate configuration of a plurality of devices, and it is not restricted to an apparatus in which the devices of the respective configurations are accommodated within an identical housing.

As described above, according to the configuration of the invention, document identification information and user identification information are respectively acquired from a document IC card and a user IC card, information indicating which user took out or restored a specified document is recorded as log data, and information corresponding to each user, that is, the position information of the document which the user utilized in the past is offered on the basis of the log data. Therefore, even in a case where the user forgot a document name, an author name or the like, the document utilized in the past can be immediately detected to acquire the position information. Besides, in a case where the user performed document processing such as copying or scanning, image data acquired in the processing or thumb-nail data based on the image data are recorded as log data, and the data can be offered to the user in compliance with his/her request, so that the user is permitted to confirm the pertinent document efficiently and reliably.

What is claimed is:

1. An information processing apparatus comprising:
   an input section that receives document identification information, which are output as output signals from respective transmission portions that are set to correspond to respective documents, and user identification information, which are output as output signals from respective transmission portions set to correspond to users;
   a position calculation section that calculates document positions and user positions on a basis of the document identification information and the user identification information, which are input to the input section;
   a storage section that stores the document positions and the user positions, which are calculated by the position calculation section;
   a log information record section that records document use histories of the users by detecting usage of the document on a basis of the document positions and the user positions changing concurrently, which are stored in the storage section, the usage of the document being detected when both the document positions and the user positions change concurrently in a situation where both the document positions and the user positions are substantially the same;
   a display data generation section that generates display data indicating a document position of a document, which was used by a particular user, on a basis of the document use histories of the particular user, which is recorded in the log information record section;
   a display section that outputs the display data generated by the display data generation section,
   wherein the log information record section records information on movement of each document by the users, as log information on a basis of change of each document position over time and change of each user position over time, and the display section outputs the generated display data in an order of a higher frequency of use or an order of the dates used.

2. The information processing apparatus according to claim 1, further comprising:
   a document database that stores detailed information corresponding to the documents, wherein:
   the display data generation section acquires the detailed information corresponding to the document, which was used by the user, from the document database to generate the display data containing the acquired detailed information.

3. The information processing apparatus according to claim 1, wherein:
   the log information record section records image data of a document, which is acquired by an information processing device connected through a network to the information processing apparatus, and data corresponding to a user who has executed said acquiring the image data, and
   the display data generation section acquires at least one of the image data and thumb-nail information based on the image data, from the log information record section to generate the display data containing the acquired information.

4. The information processing apparatus according to claim 1, wherein the information processing apparatus further detects whether or not the particular user approaches any of the information processing apparatus and other information processing apparatuses connected through a network to the information processing apparatus, to output the display data generated by the display data generation section on a display section of the information processing apparatus, which the user has approached.

5. The information processing apparatus according to claim 1, wherein the log information record section records document use histories of the user on a basis of a correlation between a change in document positions and a change in the user positions, which are stored in the storage section.

6. The information processing apparatus according to claim 1, wherein in response to a request by a user, the display generation section generates a display indicating document attribute information, on the basis of the document use histories of the user.

7. A document management system comprising:
   document-associated-signal output devices that are disposed to correspond to respective documents, each of the document-associated-signal output devices comprising:
   a storage portion that stores document identification information; and
   a transmission portion that outputs the document identification information stored in the storage portion;

user-associated-signal output devices that are disposed to correspond to respective users, each of the user-associated-signal output devices comprising:
a storage portion that stores user identification information; and
a transmission portion that outputs the user identification information stored in the storage portion; and
an information processing apparatus that receives the document identification information output from the document-associated-signal output devices, and the user identification information output from the user-associated-signal output devices, the information processing apparatus that executes information analyses, wherein:
the information processing apparatus comprises:
an input section that receives the document identification information and the user identification information;
a position calculation section that calculates document positions and user positions on a basis of the document identification information and the user identification information, which are input to the input section;
a storage section that stores the document positions and the user positions, which are calculated by the position calculation section;
a log information record section that records document use histories of the users by detecting usage of the document on a basis of the document positions and the user positions changing concurrently, which are stored in the storage section, the usage of the document being detected when both the document positions and the user positions change concurrently in a situation where both the document positions and the user positions are substantially the same;
a display data generation section that generates display data indicating a document position of a document, which was used by a particular user, on a basis of the document use histories of the particular user, which is recorded in the log information record section;
a display section that outputs the display data generated by the display data generation section,
wherein the log information record section records information on movement of each document by the users, as log information on a basis of change of each document position over time and change of each user position over time, and
the display section outputs the generated display data in an order of higher frequency of use or an order of the dates used.

8. The document management system according to claim 7, wherein the document-associated-signal output devices and the user-associated-signal output devices are IC cards.

9. The document management system according to claim 7, wherein the log information record section records document use histories of the user on a basis of a correlation between a change in document positions and a change in the user positions, which are stored in the storage section.

10. An information processing method comprising:
inputting document identification information, which are output as output signals from respective transmission portions set to correspond to respective documents, and user identification information, which are output as output signals from respective transmission portions set to correspond to users;
calculating document positions and user positions on a basis of the input document identification information and the input user identification information to store calculated data in a storage section;
recording document use histories of the users by detecting usage of the document on a basis of the document positions and the user positions changing concurrently, which are stored in the storage section, the usage of the document being detected when both the document positions and the user positions change concurrently in a situation where both the document positions and the user positions are substantially the same;
generating display data indicating a document position of a document, which was used by a particular user, on a basis of the recorded document use history of the particular user;
outputting the display data generated in an order of a higher frequency of use or an order of the dates used; and
recording information on movement of each document by the users, as log information on a basis of change of each document position over time and change of each user position over time.

11. The method according to claim 10, wherein the generating comprises acquiring detailed information corresponding to the document, which was used by the particular user, from a document database to generate the display data containing the acquired detailed information.

12. The method according to claim 10, wherein:
the recording comprises recording image data of a document, which is acquired by an information processing device connected through a network, and data corresponding to a user who has executed said acquiring the image data, and
the generating comprises acquiring at least one of the image data and thumb-nail information based on the image data, from log information record section to generate the display data containing the acquired information.

13. The method according to claim 10, further comprising:
detecting whether or not the particular user approaches any of information processing apparatuses connected through a network, wherein:
the outputting comprises outputting the display data generated on a display section of the information processing apparatus, which the particular user has approached.

14. The information processing method according to claim 10, wherein the document use histories of the user are recorded on a basis of a correlation between a change in document positions and a change in the user positions, which are stored in the storage section.

* * * * *